Patented Oct. 3, 1939

2,175,003

UNITED STATES PATENT OFFICE 2,175,003

PROCESS FOR THE PREPARATION OF HEXAHYDRO-PARA-PHENYLENE DIAMINE

Caryl Sly, Wilmington, Del., assignor to E. I. du Pont de Nemours & Company, Wilmington, Del., a corporation of Delaware No Drawing. Application May 26, 1937, Serial No. 144,918

6 Claims. (Cl. 260—563)

This invention relates to liquid phase catalytic hydrogenation and more particularly to the hydrogenation of para-phenylenediamine.

This invention has as its object the preparation of hexahydro-para-phenylenediamine (1,4-diaminocyclohexane).

The above object is accomplished by the catalytic hydrogenation of para-phenylenediamine in the liquid phase, at a temperature within the range of 120° to 200° C. and at a pressure within the range of 5 to 300 atmospheres, in the presence of a nickel or cobalt hydrogenation catalyst.

The following examples set forth certain well defined instances of the application of this invention. They are, however, not to be considered as limitations thereof since many modifications may be made without departing from the spirit and scope of this invention.

Example 1

Seventy-five grams of para-phenylenediamine, 150 grams of dioxane, and 12 grams of a reduced nickel catalyst supported on kieselguhr were charged into an autoclave. The reaction mixture was heated to 180° C. under 2000–3000 lbs. per square inch hydrogen pressure with constant agitation. At the end of four hours hydrogen absorption was essentially complete. Distillation of the product gave 40% of the hexahydro-para-phenylenediamine, B. P. 109° to 111° C. per 45 mm.

Example 2

Into a small autoclave were charged 1200 grams of para-phenylenediamine, 2400 grams of decahydronaphthalene, and 240 grams of nickel-on-kieselguhr catalyst. With constant stirring the contents were heated at 180° C. under 2000–2500 lbs. per square inch hydrogen pressure for 12 hours. As the reaction mixture cooled, most of the hexahydro derivative crystallized out and was filtered out along with the catalyst. After extracting this solid with hot alcohol and distilling the alcoholic extract, 426 grams of the desired hexahydro-para-phenylenediamine was isolated.

Certain conditions of pressure, temperature, solvent, etc., are indicated in the examples. These conditions can be varied within the scope of this invention. The hydrogen pressure may vary from 5 to 300 atmospheres and the temperature from 120° to 200° C. The preferred pressure is in the range of 150 atmospheres and the preferred temperature in the range of 180° C.

Either massive or supported nickel and cobalt catalysts or their chromites may be used. It is preferable to use the catalyst in amounts varying from 1% to 10%. The amount of catalyst is dependent upon its activity and the conditions of temperature, pressure, agitation, etc.

As indicated in the examples, I prefer to use a solvent although the hydrogenation will proceed without one. The solvent used should be inert toward the diamines and preferably should not hydrogenate under the conditions employed. In addition to dioxane and decahydronaphthalene cited in the examples, cyclohexane or other saturated hydrocarbons, and ethers such as dibutyl ether may be used.

While I have used only para-phenylenediamine as the starting material, it is possible to start with either 1,4-dinitrobenzene or p-nitroaniline, hydrogenate to para-phenylenediamine at a low temperature and then raise the temperature and hydrogenate the benzene ring.

This invention provides a simple and commercially feasible method for the preparation of hexahydro-para-phenylenediamine.

It is apparent that many widely different embodiments of this invention may be made without departing from the spirit and scope thereof and therefore it is not intended to be limited except as indicated in the appended claims.

I claim:

1. The process which comprises catalytically hydrogenating para-phenylenediamine in the liquid phase, at a temperature between 120° and 200° C. and under a pressure between 5 and 300 atmospheres, in the presence of a hydrogenation catalyst containing as an essential component a member selected from the group consisting of nickel and cobalt.

2. The process in accordance with claim 1 characterized in that the reaction is carried out in the presence of an inert organic solvent.

3. The process in accordance with claim 1 characterized in that the catalyst is a nickel-on-kieselguhr hydrogenation catalyst.

4. The process in accordance with claim 1 characterized in that the reaction is carried out at a temperature of about 180° C.

5. The process in accordance with claim 1 characterized in that the reaction is carried out under a pressure of about 150 atmospheres.

6. The process which comprises catalytically hydrogenating para-phenylenediamine in solution in dioxane, at a temperature of about 180° C. and under a pressure of about 150 atmospheres, in the presence of a nickel-on-kieselguhr hydrogenation catalyst, and recovering the diamino cyclohexane formed.

CARYL SLY.